(12) United States Patent
Chen

(10) Patent No.: US 8,144,455 B2
(45) Date of Patent: Mar. 27, 2012

(54) MOUNTING APPARATUS FOR EXPANSION CARD

(75) Inventor: Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 307 days.

(21) Appl. No.: 12/651,158

(22) Filed: Dec. 31, 2009

(65) Prior Publication Data
US 2011/0110051 A1  May 12, 2011

(30) Foreign Application Priority Data

Nov. 6, 2009  (CN) .......................... 2009 2 0314284

(51) Int. Cl.
*H05K 5/00* (2006.01)
*H05K 7/00* (2006.01)
*H04M 1/00* (2006.01)
*A47B 81/00* (2006.01)

(52) U.S. Cl. ......... 361/679.32; 361/679.31; 361/679.34; 361/679.35; 361/679.36; 361/679.45; 455/575.3; 312/223.1; 312/223.2

(58) Field of Classification Search .................. 361/681, 361/683, 679.01, 801, 804, 679.29, 679.55, 361/679.58, 679.59, 728–732, 740, 679.31–679.49; 455/575.3, 550.1
See application file for complete search history.

(56) References Cited

U.S. PATENT DOCUMENTS
2010/0271768 A1* 10/2010 Fan et al. .................. 361/679.4
* cited by examiner

*Primary Examiner* — Robert J Hoffberg
*Assistant Examiner* — Jerry Wu
(74) *Attorney, Agent, or Firm* — Altis Law Group, Inc.

(57) ABSTRACT

A mounting apparatus for an expansion card with a blocking piece is disclosed. The mounting apparatus includes a mounting bracket and a fixing piece. The mounting bracket includes a support plate with two bent portions. The fixing piece is pivotably mounted on the mounting bracket. The fixing piece includes a resisting piece, two resilient pressing pieces, and an engaging portion. The resisting piece secures the blocking piece to the support plate. The two resilient pressing pieces are connected to the resisting piece. The engaging portion retains the fixing piece to the mounting bracket. A pivot portion protrudes from each pressing piece and is received in each bent portion. The two pressing pieces are oppositely pressed to disengage the pivot portion from the bent portion.

15 Claims, 6 Drawing Sheets

MOUNTING APPARATUS FOR EXPANSION CARD

BACKGROUND

1. Technical Field

The present disclosure relates to mounting apparatus, and particularly to a mounting apparatus for securing an expansion card.

2. Description of Related Art

Nowadays, most computer systems or other electronic devices employ a plurality of circuit cards, such as expansion cards and adapters. These cards are typically mounted to a computer motherboard in a perpendicular fashion relative to the computer motherboard. In particular, the cards are usually inserted into edge card connectors, which are mounted on the computer motherboard. However, merely inserting a card into an edge connector is insufficient to securely maintain the card within the computer chassis. A card connected in this fashion could easily disconnect from the edge connector, which may prevent, or significantly inhibit, acceptable operation of the computer. Accordingly, additional structure is normally required to secure a card within a computer chassis. A conventional manner of securing a card within a computer chassis is to provide a card bracket fastened to the computer chassis with a removable screw. However, a significant disadvantage of a screw-secured bracket is that the screw can be inadvertently dropped into the computer chassis during installation and removal of the bracket.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
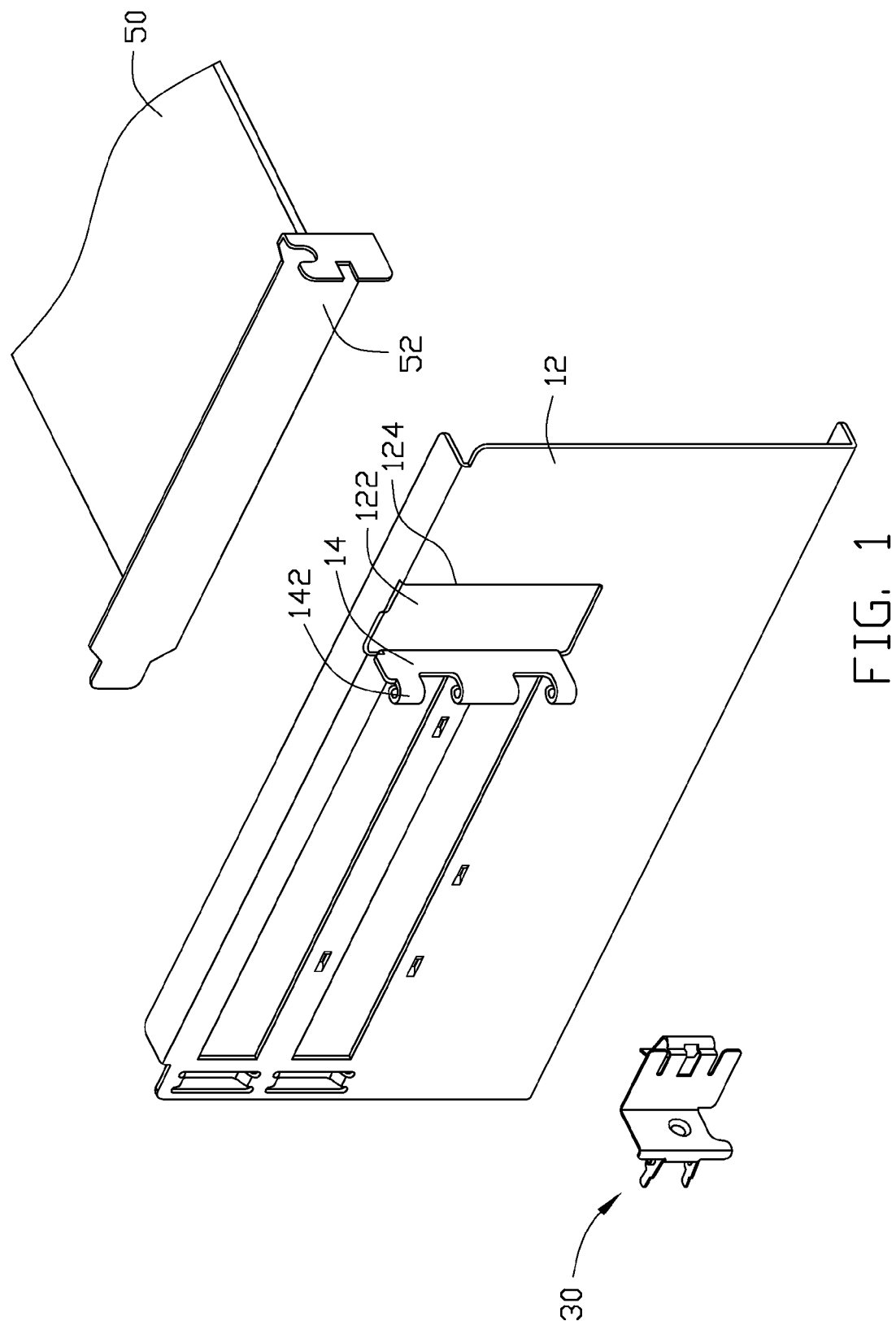
FIG. 1 is an exploded, isometric view of a mounting apparatus and an expansion card in accordance with an embodiment.

Referring to FIG. 1, a mounting apparatus is used for mounting an expansion card 50. The expansion card 50 is secured to a blocking piece 52. The mounting apparatus in accordance with an embodiment includes a mounting bracket 10, and a fixing piece 30 pivotably mounted to the mounting bracket 10.

The mounting bracket 10 includes a base plate 12 and a support plate 14 bent from the base plate 12. The support plate 14 is perpendicular to the base plate 12. A mounting opening 122 is defined in the base plate 12 adjacent to the support plate 14. A fixing flange 124 is formed on the base plate 12 adjacent to the mounting opening 122. Two C-shaped bent portions 142 are bent from a distal end of the support plate 14 at intervals.

Figure 2:
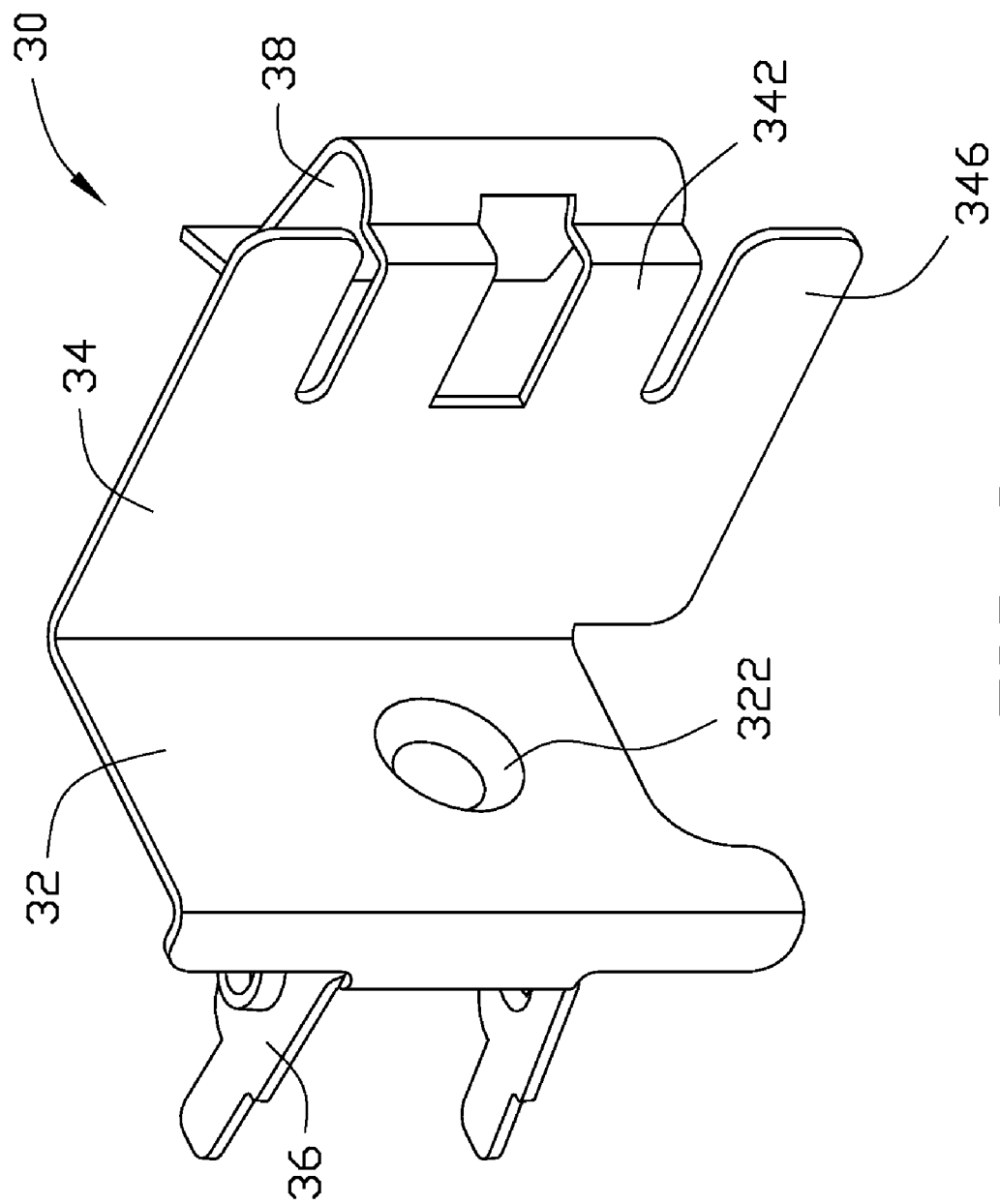
FIG. 2 is an enlarged view of a fixing piece of FIG. 1.
Figure 3:
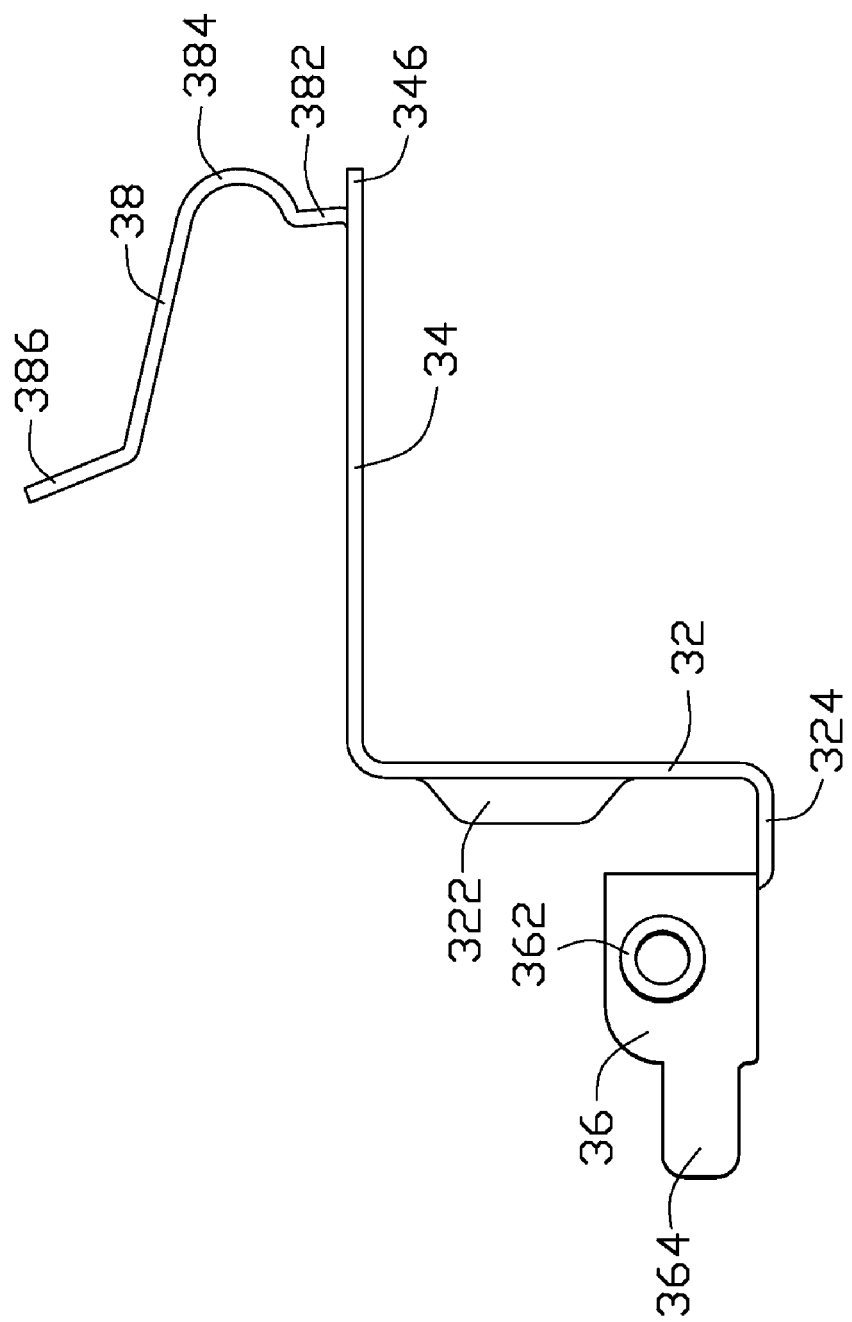
FIG. 3 is a top view of the fixing piece of FIG. 2.
Figure 4:
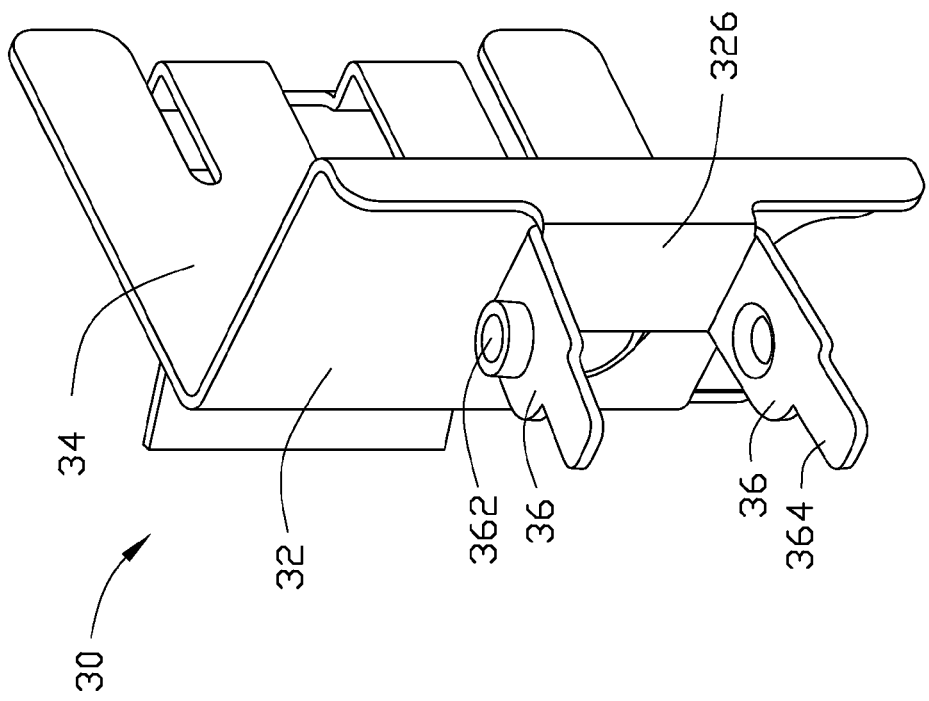
FIG. 4 is similar to FIG. 4, but shown from another aspect.

Referring to FIG. 2, FIG. 3 and FIG. 4, the fixing piece 30 includes two resilient pressing pieces 36, a resisting piece 32, an extension portion 34 perpendicular to the resisting piece 32, and an engaging portion 38. A distal end of the resisting piece 32 is bent to form a flange 324 and a connecting piece 326. The two pressing pieces 36 extend from two edges of the connecting piece 326 respectively. A U-shaped configuration is formed by the resisting piece 32, the flange 324, and the connecting piece 326. An angle between each pressing piece 36 and the connecting piece 326 may exceed 90 degrees. A pivot portion 362 protrudes from each pressing portion 36 and is received in each bent portion 142. Each pivot portion 362 is a hollow cylindrical flange. A pressing portion 364 extends from each pressing piece 36 positioned away from the connecting piece 362. A round protrusion 322 protrudes from the resisting piece 32 facing the support plate 12 to resist against the blocking piece 52. Two resilient connecting portions 342 are formed from the extension portion 34 to connect to the engaging portion 38. Two extension flanges 346 extend from a distal end of the extension portion 34. The engaging portion 38 includes an engaging connection portion 382 connecting to the connecting portion 342. An arcuate engaging flange 384 and an operating portion 386 connects to the engaging flange 384.

Figure 5:
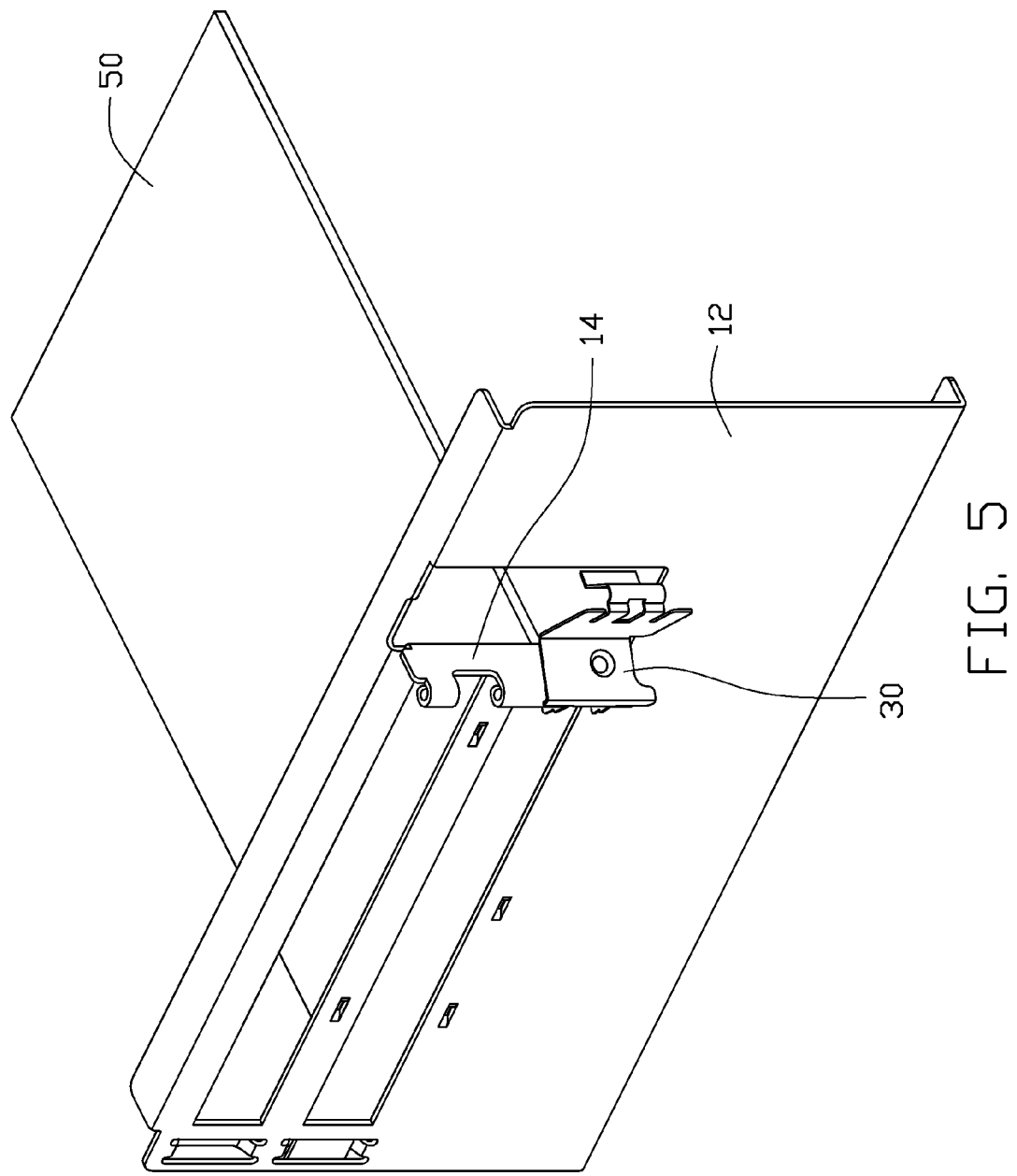
FIG. 5 is an assembled view before the fixing piece engaging.

Referring to FIG. 5, in assembly, the two pressing portions 364 are pressed inward. The two pressing pieces 36 are deformed. The two pivot portions 362 are received in the two bent portions 142. The two pressing pieces 36 are released. The pressing pieces 36 rebound to engage the corresponding bent portion 142. The fixing piece 30 is pivotably mounted to the mounting bracket 10.

Figure 6:
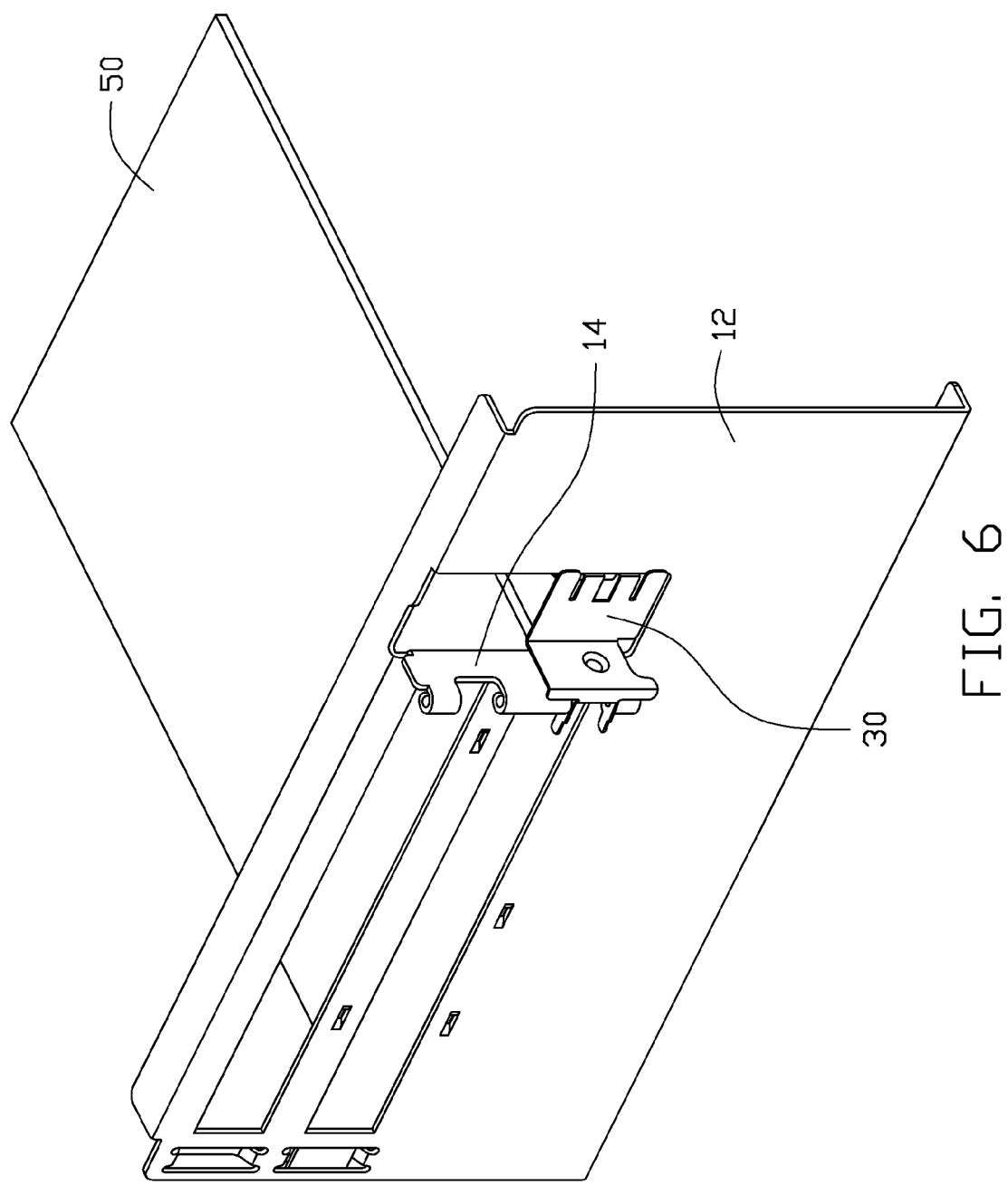
FIG. 6 is an assembled view of FIG. 5.

Referring to FIG. 6, in use, the expansion card 50 is mounted on the mounting bracket 10. The blocking piece 52 is located between the support plate 14 and the resisting piece 32. When the fixing piece 30 is rotated, the fixing flange 124 is engaged between the engaging flange 384 and the extension flange 346. The protrusion 322 resists against the blocking piece 52. The expansion card 50 is fixed on the mounting bracket 10. The operating portion 386 is pressed toward the extension portion 34. The engaging flange 384 is disengaged from the fixing flange 124. The protrusion 322 disengages from the blocking piece 52 so that the expansion card 50 is unlocked.

In disassembly, the pressing portion 364 is pressed. The pressing piece 36 disengages from the bent portion 142 to unlock the fixing piece 30. In one embodiment, the pressing piece 36 is located on the resisting piece 32 to complete the same functions.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for an expansion card with a blocking piece, the mounting apparatus comprising:
a mounting bracket comprising a support plate, two bent portions formed on the support plate; and a fixing piece pivotably mounted on the mounting bracket, the fixing piece comprising:
  a resisting piece, the resisting piece capable of securing the blocking piece to the support plate, the resisting piece having a round protrusion to resist against the blocking piece, and the resisting piece is bent to form a connecting piece;
  two opposite edges of the connecting piece extend to form two resilient pressing pieces, and an angle between each of the two resilient pressing pieces and the connecting piece exceeds 90 degrees; and
  an engaging portion capable of securing the fixing piece to the mounting bracket;
  wherein a pivot portion protrudes from the each of two resilient pressing pieces and is received in each of the two bent portions, and the two resilient pressing pieces are capable of being pressed to disengage the pivot portion from the each of the two bent portions.

2. The mounting apparatus of claim 1, wherein a flange is located between the connecting piece and the resisting piece.

3. The mounting apparatus of claim 1, wherein an end of the each of the two resilient pressing pieces forms a pressing portion.

4. The mounting apparatus of claim 1, wherein the pivot portion is a hollow cylinder.

5. The mounting apparatus of claim 1, wherein a distal end of the support plate, away from the resisting piece, is bent to form the each of the two bent portions; the each of the two bent portions has a C-shaped configuration.

6. The mounting apparatus of claim 1, wherein the fixing piece further comprises an extension portion perpendicular to the resisting piece, and the engaging portion is located on a distal end of the extension portion.

7. The mounting apparatus of claim 6, wherein the engaging portion comprises an arcuate engaging flange bending from the distal end of the extension portion, the distal end of the extension portion comprises an extension flange, and the mounting bracket further comprises a fixing flange located between the engaging flange and the extension flange.

8. The mounting apparatus of claim 7, wherein a distal end of the engaging flange, away from the extension portion, is bent to form an operating portion.

9. A mounting apparatus for an expansion card with a blocking piece, the mounting apparatus comprising:
a mounting bracket comprising a support plate, two bent portions formed on the support plate; and
a fixing piece pivotably mounted on the mounting bracket, and the fixing piece comprising:
  a resisting piece capable of securing the blocking piece to the support plate, the resisting piece having a round protrusion to resist against the blocking piece, and the resisting piece is bent to form a connecting piece;
  two opposite edges of the connecting piece extend to form the two resilient pressing pieces, and an angle between each of the two resilient pressing pieces and the connecting piece exceeds 90 degrees;
  a plurality of pivot portions, one of the plurality of pivot portions protruding from the each of two resilient pressing pieces and received in each of the two bent portions, the two resilient pressing pieces are capable of being pressed so that the plurality of pivot portions are capable of disengaging from the two bent portions; and
  an engaging portion capable of retaining the fixing piece to the mounting bracket.

10. The mounting apparatus of claim 9, wherein an end of the each of the two resilient pressing pieces forms a pressing portion away from the connecting piece.

11. The mounting apparatus of claim 9, wherein each of the plurality of pivot portions is a hollow cylindrical flange.

12. The mounting apparatus of claim 9, wherein a distal end of the support plate, away from the resisting piece, is bent to form each of the two bent portions; and the each of the two bent portions has a C-shaped configuration.

13. The mounting apparatus of claim 9, wherein the fixing piece further comprises an extension portion perpendicular to the resisting piece, and the engaging portion is located on a distal end of the extension portion.

14. The mounting apparatus of claim 13, wherein the engaging portion comprises an arcuate engaging flange bending from the distal end of the extension portion, the distal end of the extension portion comprises an extension flange, and the mounting bracket further comprises a fixing flange located between the engaging flange and the extension flange.

15. The mounting apparatus of claim 14, wherein a distal end of the engaging flange, away from the extension portion, is bent to form an operating portion.

* * * * *